(12) United States Patent
Addington et al.

(10) Patent No.: US 8,089,686 B2
(45) Date of Patent: Jan. 3, 2012

(54) ELECTRONIC DISPLAY DEVICE PROVIDING STATIC GRAYSCALE IMAGE

(75) Inventors: Cary G. Addington, Albany, OR (US); Jong-Souk Yeo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 12/578,939

(22) Filed: Oct. 14, 2009

(65) Prior Publication Data

US 2011/0085224 A1 Apr. 14, 2011

(51) Int. Cl.
*G02B 26/00* (2006.01)
*G09G 3/34* (2006.01)

(52) U.S. Cl. ........................................ 359/296; 345/107
(58) Field of Classification Search .................. 359/296, 359/238; 345/107; 430/32; 204/600
See application file for complete search history.

(56) References Cited

U.S. PATENT DOCUMENTS

| 6,130,774 | A | 10/2000 | Albert et al. |
| 6,741,385 | B2 | 5/2004 | Ikeda et al. |
| 6,781,745 | B2 | 8/2004 | Chung et al. |
| 6,822,783 | B2 | 11/2004 | Matsuda et al. |
| 7,167,155 | B1 | 1/2007 | Albert et al. |
| 7,312,794 | B2 | 12/2007 | Zehner et al. |
| 7,542,024 | B2 | 6/2009 | Koyama |
| 2003/0016429 | A1* | 1/2003 | Ikeda et al. ............... 359/238 |
| 2009/0015545 | A1* | 1/2009 | Kato et al. ................ 345/107 |
| 2010/0118385 | A1* | 5/2010 | Minami .................... 359/296 |

* cited by examiner

*Primary Examiner* — William Choi (57) ABSTRACT

In one embodiment, a device includes a first display element including: a first electrode; a transparent dielectric layer having recessed regions therein over the first electrode; a half-toned second electrode opposite the first electrode; and a fluid with colorant particles between the first electrode and the second electrode, wherein a voltage signal applied between the first electrode and the second electrode controls movement of the colorant particles such that a first voltage signal provides a clear optical state by compacting the colorant particles into the recessed regions and a second voltage signal provides a grayscale optical state by attracting the colorant particles to the second electrode.

20 Claims, 9 Drawing Sheets

ELECTRONIC DISPLAY DEVICE PROVIDING STATIC GRAYSCALE IMAGE

CROSS-REFERENCE TO RELATED APPLICATIONS

This Application is related to U.S. patent application Ser. No. 12/411,828, entitled "ELECTRO-OPTICAL DISPLAY," filed Mar. 26, 2009, which is incorporated herein by reference.

BACKGROUND

Electrophoresis is the translation of charged objects in a fluid in response to an electric field. Electrophoretic inks are useful as a medium to enable bistable, low power types of displays. Electrophoretic displays have been developed using a dyed fluid and white particles sandwiched between parallel electrodes on top and bottom substrates. When an electric field is applied transverse to the substrates across the dyed fluid to translate the white particles to the viewing surface, the display appears white. When the electric field is reversed to translate the white particles away from the viewing surface, the display appears the color of the dyed fluid. Conventional segmentation of electrophoretic displays provide set boundaries in which each segment appears white or the color of the dyed fluid. This limits the representation of displayed images since a static grayscale optical state is not enabled by typical segmentation of electrophoretic displays. In addition, conventional electrophoretic displays do not provide a good color gamut for full color displays.

DETAILED DESCRIPTION

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, a "halftoned" electrode refers to an electrode material layer that has been patterned or structured to enable a grayscale image to be displayed. The electrode material layer is structured to remove portions of the material such that only the remaining portions of the material can attract colorant particles. By controlling the amount of material remaining in a given area of the electrode, a grayscale image can be displayed.

As used herein, the term "over" is not limited to any particular orientation and can include above, below, next to, adjacent to, and/or on. In addition, the term "over" can encompass intervening components between a first component and a second component where the first component is "over" the second component.

Embodiments provide static grayscale images using electro-optical display devices. Full color static images are obtained by combining multiple single color static grayscale images into a color display. In one embodiment, to provide the static grayscale images, one or both electrodes of the electro-optical display device are patterned or halftoned. By removing specific areas/patterns of the electrode material, the electronic inks spread onto the active areas of the electrodes that are remaining on the substrate. By controlling the ratio of the areas where charged colorant particles are present and not present, grayscale is achieved. In this embodiment, a dark optical state, a grayscale optical state, and a clear optical state can be achieved.

In another embodiment, to provide the static grayscale images, a dielectric layer over an electrode of the electro-streaming display device is patterned. By removing specific areas/patterns of the dielectric material, the electronic inks spread onto the exposed areas of the electrode. By controlling the ratio of the exposed areas to unexposed areas of the electrode, grayscale is achieved. In this embodiment, a dark optical state and a grayscale optical state can be achieved but a clear optical state cannot be achieved.

In another embodiment, to provide the static grayscale images, a dielectric layer over an electrode of the electro-optical display device is patterned. By patterning the dielectric layer to include non-patterned regions and specific areas/patterns of uniformly recessed regions within the dielectric material, the electronic inks can only compact into the recessed regions of the dielectric layer. By controlling the ratio of the uniformly recessed regions to the regions that are not recessed within the dielectric layer, grayscale is achieved. In this embodiment, a dark optical state, a grayscale optical state, and a clear optical state can be achieved.

The embodiments encompass display elements having an energy gradient that induces a convective flow according to a defined pattern. The convective flow can be controlled so as to move a colorant species that is affected by such an energy source. The energy gradient is induced by methods including mechanical force, a temperature gradient, a chemical potential gradient, a concentration gradient, or other suitable disturbances. The present embodiments can be manifested in an electro-optical application where a means for inducing a convective flow includes electrodes, electrokinetic elements, heating elements, microfluidic elements, micro-electromechanical elements, or chemical reactions. Means for controlling the convective flow (e.g., a patterned electrode and/or a patterned dielectric layer to expose part of the electrodes) provides an energy transfer, such as charge transfer, to control the convective flow of the colorant species and thus the speed and direction of the species.

The display elements subsequently described use both out-of-plane movement as well as in-plane movement of colorant particles to provide the desired optical appearance. Electrokinetic principles of electro-convection and electrophoresis are used for an electro-optical display to move charged colorant particles in a carrier fluid within a display element. A display element can be a pixel, a sub-pixel, a super-pixel, a segment, or other suitable display element.

In general, a colorant particle may have a size between several nanometers and several microns and has the property of changing the spectral composition of the incident light by absorbing and/or scattering certain portions of the spectrum. As a result, the particle appears colored, which provides a desired optical effect. In other embodiments, the colorant can be a dye, which is comprised of single absorbing molecules.

Figure 1:
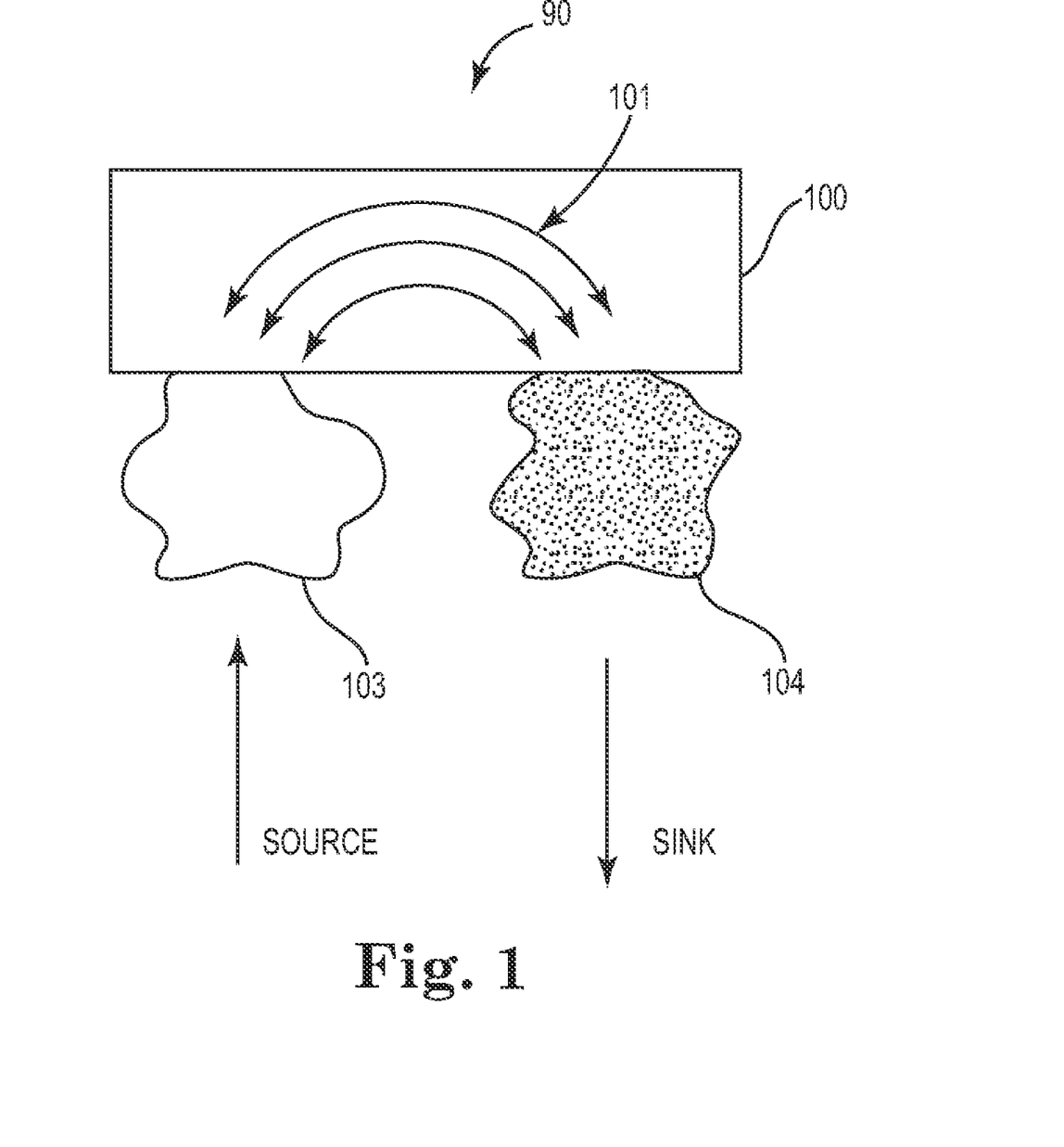
FIG. 1 is a diagram illustrating one embodiment of convective flow of colorant particles in a fluid of an electro-optical display.

FIG. 1 is a diagram illustrating one embodiment of convective flow of colorant particles in a fluid of an electro-optical display element 90. Display element 90 is a segment, a pixel, a sub-pixel, a super pixel (i.e., more than one pixel), or another suitable display element. Display element 90 includes a source 103 from which the colorant particles enter the element display volume 100 and a sink 104 to which the colorant particles flow. During display element 90 operation, the roles of source and sink can be reversed. In other words, the source can become the sink and vice versa. The flow lines 101 illustrate the movement of the colorant particles from the source 103 to the sink 104 as described by the convective movement of the carrier fluid.

The convective currents of display element 90 can be generated in numerous ways. Convection is macroscopic movement of molecules in fluids including liquids and gases. Convection is generated by unbalanced volumetric forces inside the fluids that cause different parts of the fluid to move relative to each other producing convective currents. Convection can occur under gravity if different parts of the fluid have different density caused, for example, by localized heating. Convection can also occur if there are pressure or concentration gradients inside the fluid produced by localized chemical reactions, localized heating, or other suitable disturbances. Convection can also occur if there are ionic currents in the fluid caused by external electric fields (AC or DC) and charge injection into the fluid. The moving ions then create the pressure gradient through viscous drag and excluded volume effects. Such convection is typically termed electro-convection.

Figure 2A:
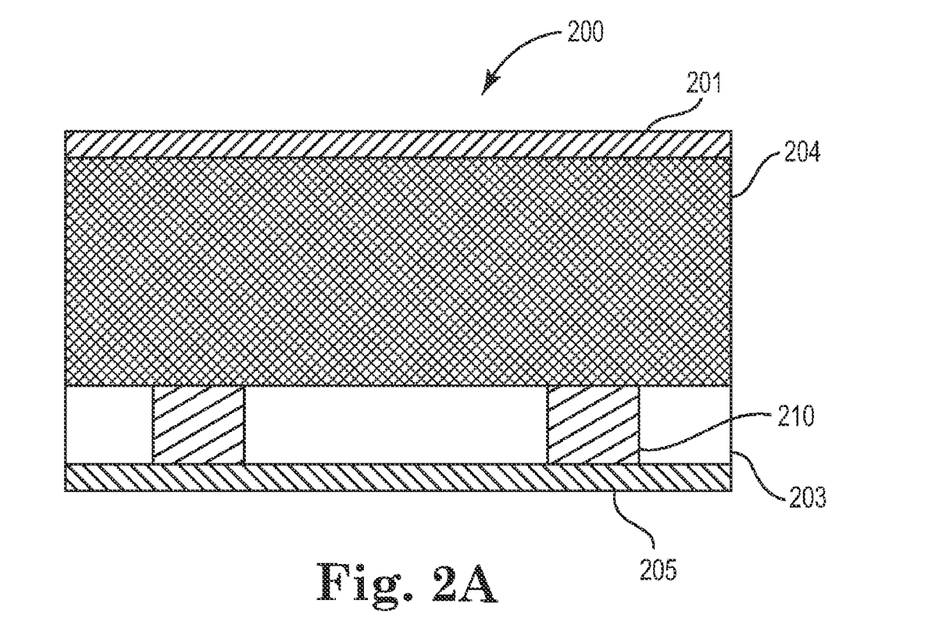
FIG. 2A illustrates a cross-sectional view of one embodiment of a dark optical state of an electro-optical display element.
Figure 2B:
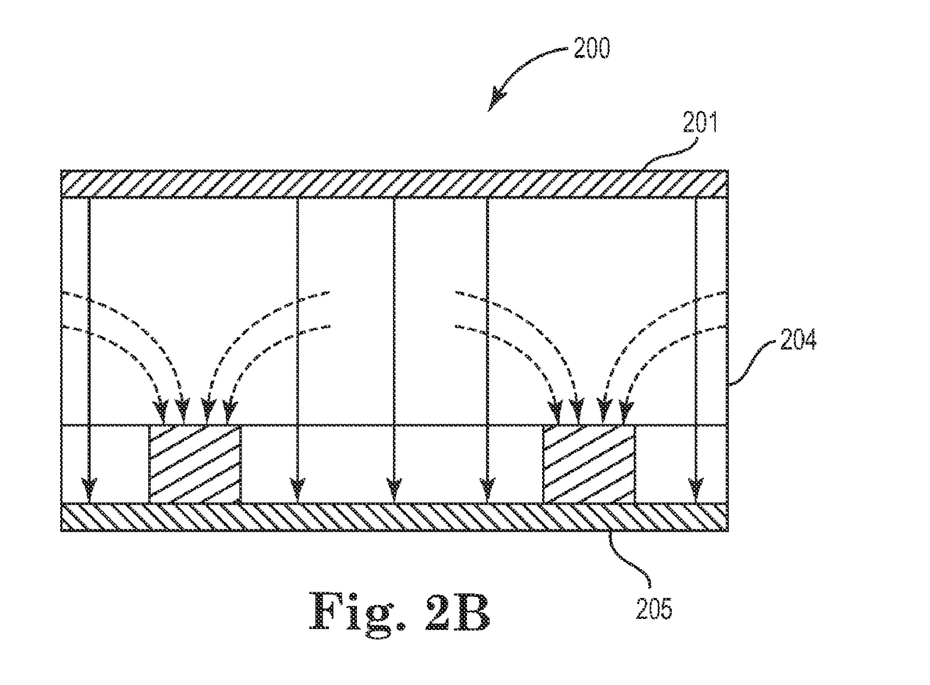
FIG. 2B illustrates a cross-sectional view of one embodiment of a clear optical state of an electro-optical display element.

FIGS. 2A and 2B illustrate one embodiment of a method for generating the convective flow within a display element 200. FIG. 2A illustrates display element 200 in a dark optical state. FIG. 2B illustrates display element 200 in a clear optical state. Both figures include a transparent top electrode 201 as the conceptual "source" of FIG. 1 and another bottom electrode 205 as the conceptual "sink" of FIG. 1. While the "source" electrode 201 of FIG. 2 is subsequently described as being transparent, the present embodiments are not required to have both electrodes as being transparent. One of either the "source" or the "sink" electrodes can be comprised of an opaque material.

The embodiment of FIGS. 2A and 2B, as well as the subsequently described embodiments, include a "sink" electrode 205 formed on a substrate that, in one embodiment, is coated with a continuous film of transparent conductive material. The transparent conductive material can include carbon nanotube layers, a transparent conducting oxide such as ITO (Indium Tin Oxide), or a transparent conducting polymer such as PEDOT (poly 3,4-ethylenedioxythiophene). Other embodiments can use other materials that provide suitable conductivity and transparency for display element 200.

In another embodiment, the substrate can be coated with or comprised of a reflective material. In yet another embodiment, the substrate can be an opaque material. In still another embodiment, a light scatterer can be formed on the substrate.

A layer of transparent electrically insulating material 203 (i.e., dielectric material) is deposited on bottom electrode 205. Dielectric layer 203 is patterned to create recessed regions 210 in dielectric layer 203 on bottom electrode 205. The recessed regions can be manufactured by many different processes. These processes include embossing or imprinting with a master or stamp or etching of dielectric layer 203. The recessed regions can be any suitable size and/or shape.

In another embodiment, electrodes are only defined within the recessed regions of dielectric layer 203. In such an embodiment, dielectric layer 203 is deposited and patterned on top of the insulating substrate first, and then the electrodes are formed inside the recess areas, for example by electroless deposition or by another suitable method. In another embodiment, bottom electrode layer 205 is patterned into a collection of electrodes first, and then dielectric layer 203 is deposited and recess areas 210 are formed directly on top of the electrodes. The alignment for the latter operation can be achieved for example by photolithography.

Display element 200 is completed by the formation of transparent "source" electrode 201 that is formed a fixed distance apart from dielectric layer 203 to thus form display volume 204 that holds the carrier fluid. The "source" electrode 201 is held at the fixed distance by a network of mechanical stops (not shown) that may include posts, walls, and/or spacer beads. The mechanical stops may be formed by embossing, imprinting, molding, or photolithography of materials such as photoresists or embossing resins.

The carrier fluid of FIGS. 2A and 2B, as well as the subsequently described embodiments, can include either polar fluids (e.g. water) or nonpolar fluids (e.g., dodecane). Additionally, anisotropic fluids such as liquid crystal can be used. The fluid may include surfactants such as salts, charging agents, stabilizers, and dispersants. In one embodiment, the surfactants provide a fluid that is an electrolyte that is able to sustain current by ionic mass transport.

The colorant particles in the carrier fluid are comprised of a charged material in the case of an electro-convective display. The colorant particle material should be able to hold a stable charge indefinitely so that repeated operation of the element does not affect the charge on the colorant particles. Colorant particle materials having a finite ability to hold a stable charge, however, can be used in accordance with the various embodiments while they maintain their charge.

In the dark optical state of display element 200, illustrated in FIG. 2A, the colorant particles are relatively uniformly distributed across the element's display volume 204 to absorb the incident light and create the dark optical appearance. The colorant particles may or may not be prevented from occupying one or more recess regions 210 in dielectric layer 203.

To switch display element 200, an electric potential difference V is applied between top electrode 201 and bottom electrode 205. This results in a clearing of the main aperture of display element 200 as illustrated in FIG. 2B. Transverse solid lines of arrows indicate electric field lines and arrows leading into the recess regions indicate the flow of colorant particles following the electrostatic and convective flows. Having the colorant particles compacted in the recess regions is subsequently referred to as the clear optical state.

Even though the electrical potential difference causes the ionic and convective flow of the fluid, the charged colorant particles do not follow the electric field lines (the solid lines). The charged colorant particles actually follow the lines of convective flow as shown by the dashed lines of FIG. 2B. In this regard, the flow is not totally electrophoretic. Under purely electrophoretic flow, the colorant particles would be pulled down vertically until stopped at the top boundary of the dielectric but would not generally move in-plane.

In one embodiment, the convective flow is induced by ionic mass transport in the carrier fluid and charge transfer between the carrier fluid and the electrodes. The charge transfer can occur when the carrier fluid is coupled to the electrodes either through direct contact with the electrodes or separated from the electrodes by an intermediate layer including one or more materials. In the latter case, charge transfer is facilitated by the internal electrical conductivity of the intermediate layer, either volumetric or via pinholes and other defects.

In another embodiment, the convective flow is a transient effect caused by the ionic mass transport in the carrier fluid, but without charge transfer between the carrier fluid and the electrode. In this case, the convective flow proceeds for a finite amount of time and facilitates the compaction of the colorant particles in the recess areas. After that the colorant particles are contained in the recesses by electrostatic forces generated by a coupling with the electrodes.

To switch the display element from the clear optical state to the dark optical state, the polarity of the voltage is reversed. This induces convective flow in the opposite direction and the colorant particles are no longer electrically contained in the recesses. As a result, the colorant particles are mass transported to the display volume and then spread relatively evenly throughout the display volume.

Convection within the display element can also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

The depth of the recesses in the dielectric layer can be defined by the following:

$$hm = \frac{L}{Lm - L} \cdot \frac{d}{1 - P} \qquad \text{Equation I}$$

where:
L is the colorant particle load by volume;
Lm is the maximum closed packed colorant particle load by volume;
d is the thickness of the main element display volume; and
P is the aperture ratio defined by $1 - A_0/A$.

The quantity A is the area of the element display volume while $A_0$ is the recess area. The total area of the defined recess regions of the first or second electrodes is sufficiently less than the area of the display element to provide optical contrast between the collected or clear particle state and the spread particle state or grayscale state.

In one embodiment, the total area of the defined recess regions of the first or second electrodes is between 1% and 10% of the area of the display element, in order to maximize the optical contrast between the clear and the dark or grayscale states. The present embodiments, however, are not limited to any predefined aperture ratio. For example, another embodiment might have a total area of the recessed regions being between 10% and 20% of the area of the display element. Still another embodiment might have a total area of the recessed regions being between 20% and 50% of the area of the display element. Other embodiments might have a total area of the recessed regions being greater than 50% of the area of the display element for embodiments where low optical contrast is desired.

In additional embodiments, a grayscale of display element 200 can be controlled by one of: an aperture ratio, a density of recess regions that are electrically active, or a depth of recess regions that are electrically active. These approaches enable geometrical control over how the colorant particles are spread throughout the display volume and collected in the recess regions through variations in the sizes of the recess regions, the spacing between the recess regions, and the depth of the recess regions. In one embodiment, the aperture ratio P and the recess depth can be adjusted to maximize the optical contrast between the clear and the dark or grayscale optical states.

The present embodiments subsequently refer to a dot structure for the recess regions or other methods for selectively patterning the dielectric on at least one of the electrodes. A dot, for purposes of the present embodiments, can be any shape and/or size as long as it satisfies the requirements for the optical contrast and other characteristics of the display element.

Figure 3A:
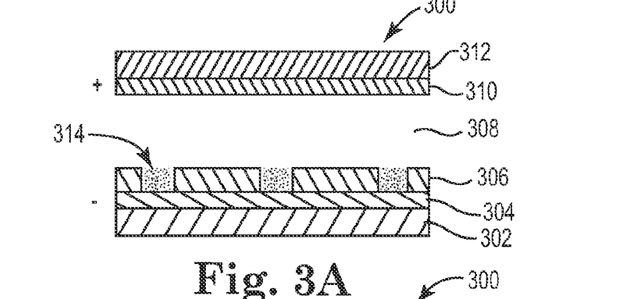
FIG. 3A illustrates a cross-sectional view of one embodiment of a clear optical state of an electro-optical display element.

FIG. 3A illustrates a cross-sectional view of one embodiment of a clear optical state of an electro-optical display element 300. Electro-optical display element 300 includes a substrate 302, a bottom electrode 304, a dielectric layer 306 including recess regions 314, a display volume 308, a top electrode 310, and a transparent material or substrate 312. In this embodiment, bottom electrode 304 is a continuous, blanket, or solid plate electrode formed on substrate 302. A dielectric layer is formed on bottom electrode 304 and patterned to provide dielectric layer 306. Dielectric layer 306 is patterned with recess regions 314 that allow the charged colorant particles to compact.

Top electrode 310 is formed on transparent material 312. Top electrode 310 is used to control the colorant particle distributions, either with a uniform, segmented, or pixelated top electrode as illustrated and described subsequently with reference to FIGS. 4A and 4B.

In operation, positively charged ink can be electrophoretically and convectively moved to bottom electrode 304, compacted into recess regions 314, and held there by a negative bias in the clear optical state. This results in a clear aperture. During a dark optical state, illustrated in FIG. 3B, the positive bias on bottom electrode 304 repels the positively charged colorant particles out of recess regions 314 into the carrier fluid in the display volume 308. In addition, the convective currents speed up the movement of particles and disburse the particles across display volume 308.

Figure 4A:
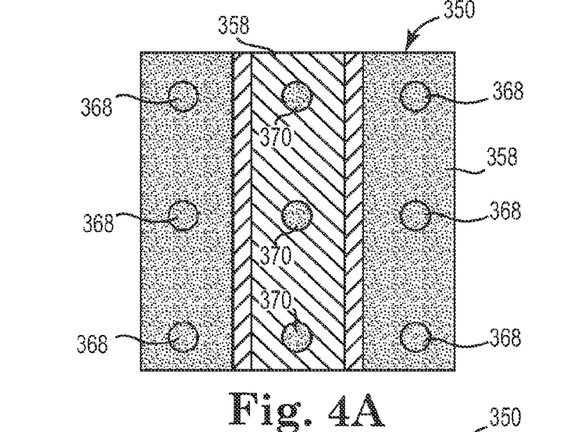
FIG. 4A illustrates a top view of one embodiment of an electro-optical display element including a segmented or pixelated electrode.
Figure 4B:
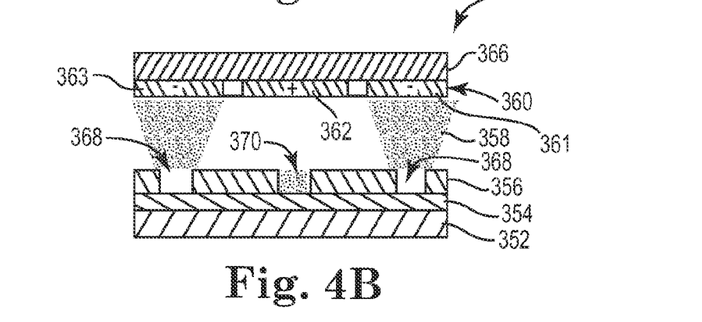
FIG. 4B illustrates a cross-sectional view of one embodiment of an electro-optical display element including a segmented or pixelated electrode.

FIG. 4A illustrates a top view and FIG. 4B illustrates a cross-sectional view of one embodiment of an electro-optical display element 350 including a segmented or pixelated top electrode. Electro-optical display element 350 includes a substrate 352, a bottom electrode 354, a dielectric layer 356 including recess regions 368 and 370, a display volume 358, a segmented or pixelated top electrode 360, and a transparent material or substrate 366. Electro-optical display element 350 includes a dot structure display. FIGS. 4A and 4B illustrate a segment, a sub-pixel, or a super-pixel display element.

Display element 350 includes a periodic distribution of dots. Each dot is a recess region 368 or 370 patterned into dielectric layer 356 to connect the display element display volume 358 to bottom electrode 354. In the illustrated embodiment, bottom electrode 354 is a blanket electrode formed on substrate 352. Segmented or pixelated top electrode 360 includes segments 361-363 and is formed over display volume 358 on transparent material 366.

Each recess region 368 and 370 patterned into dielectric layer 356 is formed under a corresponding segmented or pixelated portion 361-363 of top electrode 360. The segmented or pixelated portions 361-363 of top electrode 360 are electrically disconnected thus allowing each corresponding segmented or pixelated portion 361-363 to have a different polarity than an adjacent portion 361-363. There may be multiple recess regions under each corresponding segmented or pixelated portion 361-363 of top electrode 360 but, for simplicity, only one recess region is shown under each segmented or pixelated portion 361-363 in the figure.

Electro-optical display element 350 illustrates adjacent display elements in the light and dark optical states. In operation, assuming that the colorant particles are positively charged, if a negative voltage is applied to the segmented or pixelated portions 361 and 363 of top electrode 360, the colorant particles are attracted out of recess regions 368 into the carrier fluid in display volume 358. The center segmented or pixelated portion 362 of top electrode 360, however, has a positive voltage and thus the colorant particles are compacted in recess regions 370 making that portion of the segment or pixel clear. This method can be used to control the state of each segment or pixel.

FIGS. 4A and 4B illustrate that top electrode 360 is segmented or pixelated. In another embodiment, bottom electrode 354 is segmented or pixelated instead of top electrode 360. In yet another embodiment, both top electrode 360 and bottom electrode 354 are segmented or pixelated. In another embodiment, one or more additional electrodes can be formed between top electrode 360 and bottom electrode 354. Such additional electrodes can be used to shape the electric fields and control the translation of colorant particles.

Figure 3B:
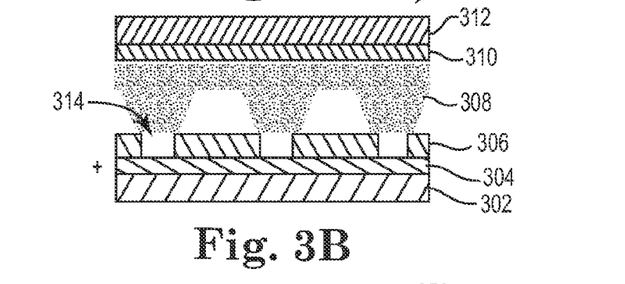
FIG. 3B illustrates a cross-sectional view of one embodiment of a dark optical state of an electro-optical display element.
Figure 5:
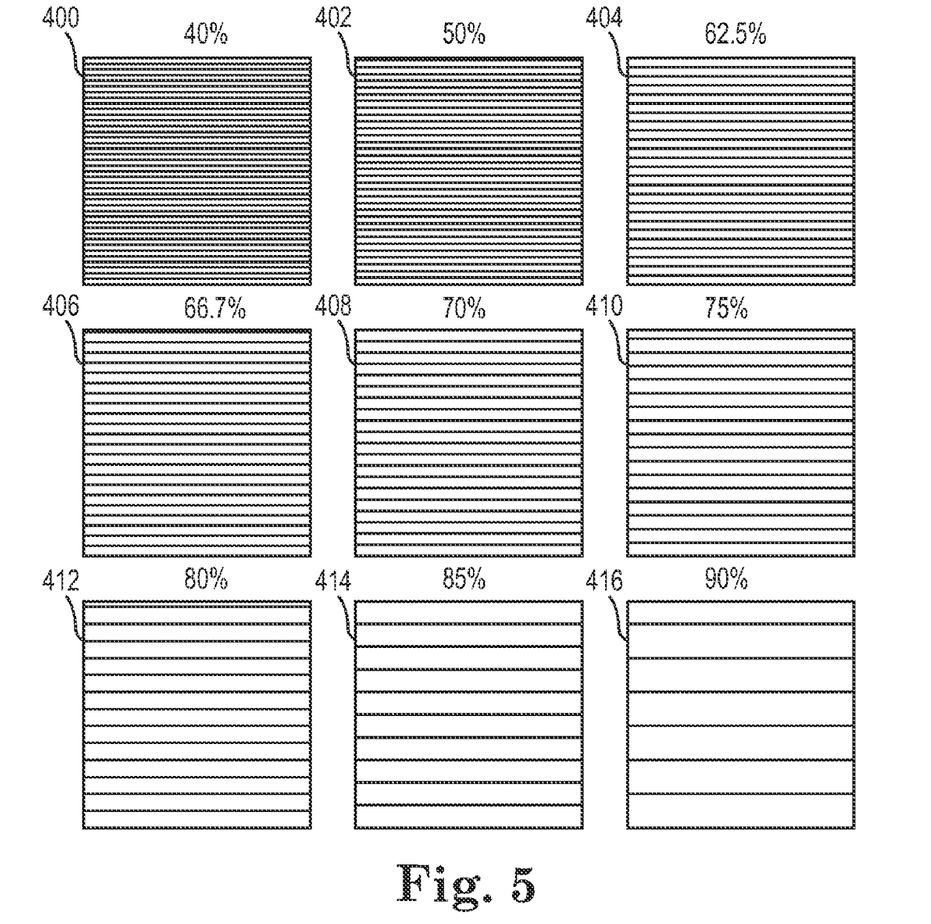
FIG. 5 illustrates one embodiment of a static grayscale patterning technique for an electro-optical display device.

FIG. 5 illustrates one embodiment of a static grayscale patterning technique for an electro-optical display device. In one embodiment, a static grayscale image is generated in an electro-optical display device by removing portions of an electrode of the display device. In one embodiment, a portion of top electrode 310 previously described and illustrated with reference to FIGS. 3A and 3B or a portion of top electrode 360 previously described and illustrated with reference to FIGS. 4A and 4B may be removed as indicated in FIG. 5 to produce a static grayscale image. In another embodiment, a portion of bottom electrode 304 previously described and illustrated with reference to FIGS. 3A and 3B or a portion of bottom electrode 354 previously described and illustrated with reference to FIGS. 4A and 4B may be removed as indicated in FIG. 5 to produce a static grayscale image. In another embodiment, dielectric layer 306 previously described and illustrated with reference to FIGS. 3A and 3B is patterned or dielectric layer 356 previously described and illustrated with reference to FIGS. 4A and 4B is patterned as indicated in FIG. 5 to produce a static grayscale image.

The lines in FIG. 5 illustrate the ITO, PEDOT, or conductive material that has been removed from the electrode or the dielectric material that has been removed or has not been recess patterned within the dielectric layer. The percent values in FIG. 5 indicate how much ITO, PEDOT, or conductive material of the electrode remains in a given area or how much dielectric material remains in a given area.

At 400, 40% of the dielectric material or 40% of the ITO, PEDOT, or conductive material of the electrode remains. At 402, 50% of the dielectric material or 50% of the ITO, PEDOT, or conductive material of the electrode remains. At 404, 62.5% of the dielectric material or 62.5% of the ITO, PEDOT, or conductive material of the electrode remains. At 406, 66.7% of the dielectric material or 66.7% of the ITO, PEDOT, or conductive material of the electrode remains. At 408, 70% of the dielectric material or 70% of the ITO, PEDOT, or conductive material of the electrode remains. At 410, 75% of the dielectric material or 75% of the ITO, PEDOT, or conductive material of the electrode remains. At 412, 80% of the dielectric material or 80% of the ITO, PEDOT, or conductive material of the electrode remains. At 414, 85% of the dielectric material or 85% of the ITO, PEDOT, or conductive material of the electrode remains. At 416, 90% of the dielectric material or 90% of the ITO, PEDOT, or conductive material of the electrode remains. By controlling the amount of dielectric material or ITO, PEDOT, or conductive material of the electrode removed in a given area, the grayscale is controlled.

Figure 6:
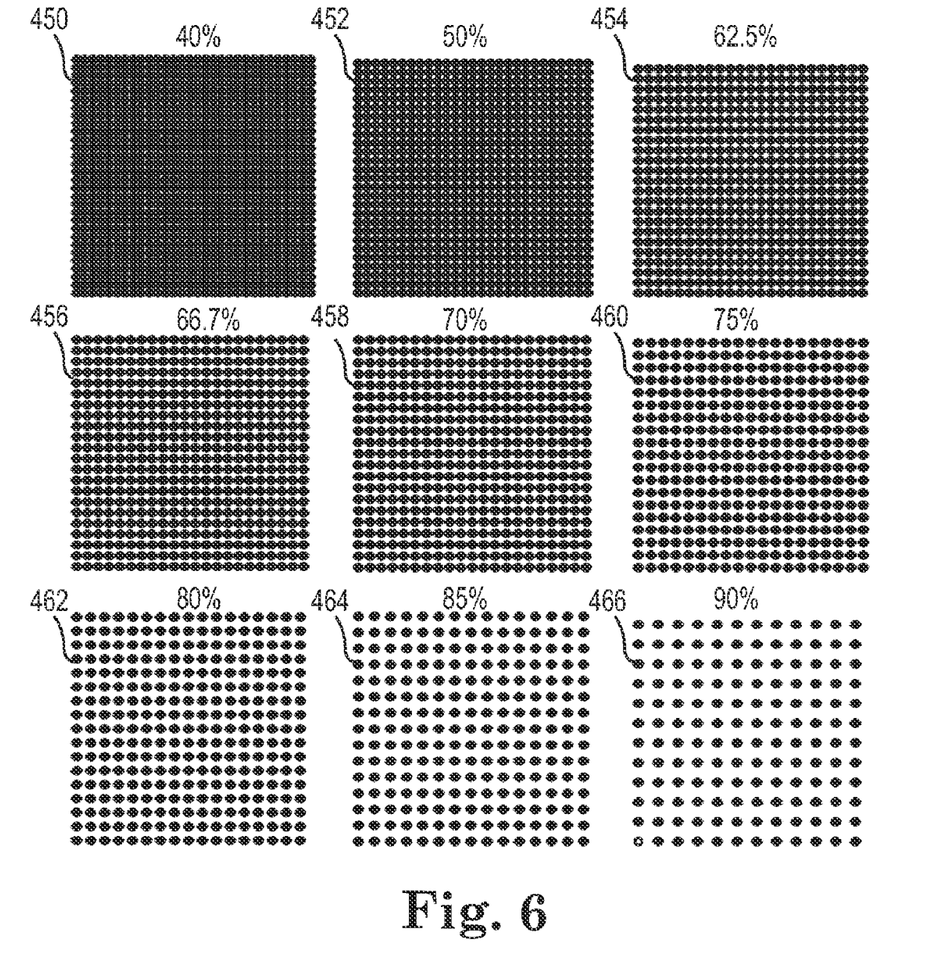
FIG. 6 illustrates another embodiment of a static grayscale patterning technique for an electro-optical display device.

FIG. 6 illustrates another embodiment of a static grayscale patterning technique for an electro-optical display device. In this embodiment, a static grayscale image is generated by removing dots of ITO, PEDOT, or conductive material of the electrode or by removing dots of dielectric material from the dielectric layer. The dots of dielectric material removed may be uniform as illustrated in FIG. 6 or stochastic. The dots in FIG. 6 illustrate the ITO, PEDOT, or conductive material that has been removed from the electrode or the dielectric material that has been removed or has not been recess patterned from the dielectric layer. The percent values in FIG. 6 indicate how much ITO, PEDOT, or conductive material of the electrode remains in a given area or how much dielectric material remains in a given area.

At 450, 40% of the dielectric material or 40% of the ITO, PEDOT, or conductive material of the electrode remains. At 452, 50% of the dielectric material or 50% of the ITO, PEDOT, or conductive material of the electrode remains. At 454, 62.5% of the dielectric material or 62.5% of the ITO, PEDOT, or conductive material of the electrode remains. At 456, 66.7% of the dielectric material or 66.7% of the ITO, PEDOT, or conductive material of the electrode remains. At 458, 70% of the dielectric material or 70% of the ITO, PEDOT, or conductive material of the electrode remains. At 460, 75% of the dielectric material or 75% of the ITO, PEDOT, or conductive material of the electrode remains. At 462, 80% of the dielectric material or 80% of the ITO, PEDOT, or conductive material of the electrode remains. At 464, 85% of the dielectric material or 85% of the ITO, PEDOT, or conductive material of the electrode remains. At 466, 90% of the dielectric material or 90% of the ITO, PEDOT, or conductive material of the electrode remains. By controlling the amount of dielectric material or ITO, PEDOT, or conductive material of the electrode removed in a given area, the grayscale is controlled.

While FIG. 5 illustrates removing lines of dielectric material or ITO, PEDOT, or conductive material to control the grayscale level and FIG. 6 illustrates removing dots of dielectric material or ITO, PEDOT, or conductive material to control the grayscale level, in other embodiments combinations of uniform or stochastic lines and dots, or other suitable shapes, can be used to create the desired level of grayscale in a given area.

The ITO, PEDOT, or conductive material can be removed in a number of different ways, such as by laser delamination, laser ablation, or wet or dry etching and photo-patterning. In one embodiment, a laser and optional collimation optics and intensity conversion optics are used in combination with a galvanometer with lens, which receives input from computer drawing files, to pattern the ITO, PEDOT, or conductive material in a fixed work plane. This embodiment enables a patterning size up to the field of view (FOV) of the galvanometer lens. In another embodiment, a laser and optional collimation optics and intensity conversion optics are used in combination with a galvanometer with lens, which receives input from computer drawing files, to pattern the ITO, PEDOT, or conductive material in a work plane with motion. In this embodiment, multiple drawing files are stitched together allowing a patterning size up to the range of motion with substrate. The galvanometer writes within its FOV, then the motion steps the substrate to the next field.

In another embodiment, a laser and optional collimation optics and intensity conversion optics are used in combination with a fixed focusing lens, which receives input from computer drawing files, to pattern the ITO, PEDOT, or conductive material in a work plane with motion. In this embodiment, multiple drawing files are stitched together allowing a patterning size up to the range of motion with substrate. In another embodiment, a laser and collimation optics, a homogenizer, and photomasks are used in combination with an imaging projection lens to pattern the ITO, PEDOT, or conductive material in a work plane with motion. In this embodiment, multiple photomasks can be inserted that are stitched together allowing a patterning size up to the range of motion with substrate. Each photomask can be fixed or scanned.

In another embodiment, a photolithography process is used to pattern the ITO, PEDOT, or conductive material. In this embodiment, photoresist is applied to an ITO, PEDOT, or conductive material substrate and photo patterned, developed, and rinsed to pattern the ITO, PEDOT, or conductive material. This embodiment enables patterning on wafer sized substrates.

In another embodiment, a roll to roll process is used to pattern the ITO, PEDOT, or conductive material. In this embodiment, embossing resin is applied to the roll of ITO, PEDOT, or conductive material and the grayscale pattern is embossed using an embossing roller. The patterned embossing resin provides a mask for etching the ITO, PEDOT, or conductive material. After etching the ITO, PEDOT, or conductive material, the embossing resin is removed. In other embodiments, other suitable processes are used to pattern the ITO, PEDOT, or conductive material.

In other embodiments, similar processes are used to pattern the dielectric layer. In one embodiment, the dielectric layer is patterned via photopatterning using a uniform dot patterned mask and a grayscale image patterned mask such that areas where recessed regions are not wanted are exposed.

Figure 7A:
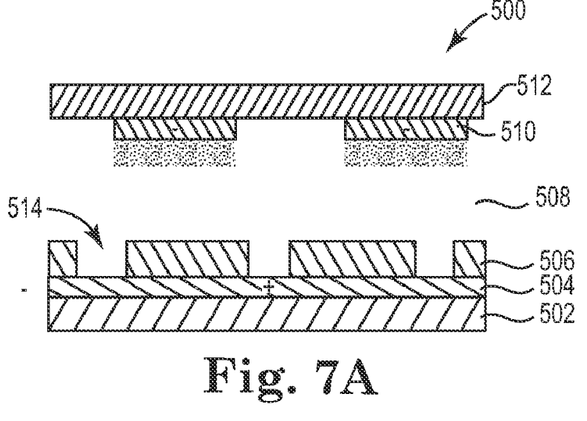
FIG. 7A illustrates a cross-sectional view of one embodiment of a grayscale optical state of an electro-optical display element.

FIG. 7A illustrates a cross-sectional view of one embodiment of a grayscale optical state of an electro-optical display element 500. Electro-optical display element 500 includes a substrate 502, a bottom electrode 504, a dielectric layer 506 including recess regions 514, a display volume 508, a patterned top electrode 510, and a transparent material or substrate 512. In this embodiment, top electrode 510 is patterned to provide a static grayscale image based on the ratio of removed and conductive regions of the electrode.

In one embodiment, substrate 502 includes a reflective material or an optically clear or transparent material, such as plastic (e.g., polyethylene terephthalate (PET)) or other suitable material. In one embodiment, transparent material or substrate 512 also includes an optically clear material, such as plastic (e.g., PET) or other suitable material. Bottom electrode 504 and top electrode 510 include inorganic materials such as ITO, organic materials such as PEDOT, nanoparticle networks such as carbon nanotubes or silver nanowires, or other suitable thin film conductive materials that can be patterned. Dielectric material 506 includes an optically clear or transparent electrically insulating material.

In operation, the grayscale state as illustrated in FIG. 7A is provided by applying a negative bias or voltage signal to top electrode 510 (for positively charged colorant particles). The negative bias to top electrode 510 attracts the colorant particles out of recess regions 514 into the carrier fluid adjacent the segments of top electrode 510 in display volume 508. In this way, a static, pre-patterned grayscale image is displayed.

In another embodiment, dielectric layer 506 is excluded from electro-optical display element 500. In this embodiment, the grayscale state as illustrated in FIG. 7A is still provided by applying the negative bias or voltage signal to top electrode 510. A clear state, however, as discussed below with reference to FIG. 7C is not possible with dielectric layer 506 excluded since there are no recess regions 514 in which the colorant particles can be compacted.

Figure 7B:
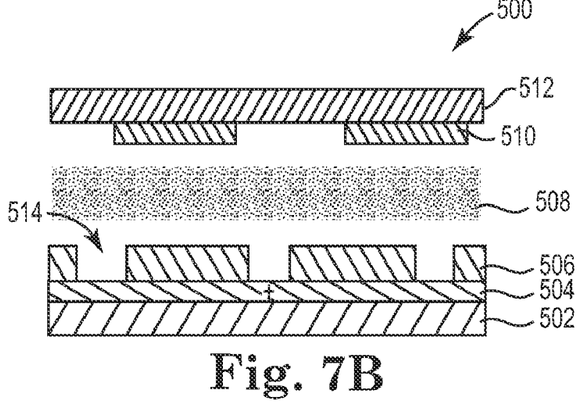
FIG. 7B illustrates a cross-sectional view of one embodiment of a dark optical state of an electro-optical display element.

FIG. 7B illustrates a cross-sectional view of one embodiment of a dark optical state of electro-optical display element 500. The dark optical state is achieved from either the grayscale optical state or the clear optical state by applying a voltage signal or pulsing opposite bias conditions on bottom electrode 504 and top electrode 510 to spread the colorant particles into display volume 508. With the colorant particles diffused uniformly within the display volume 508, the dark state is displayed.

Figure 7C:
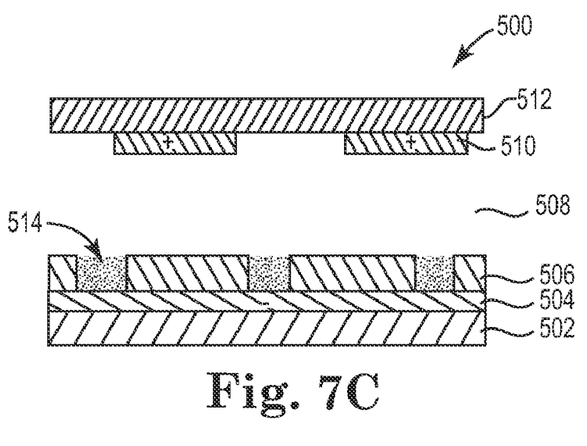
FIG. 7C illustrates a cross-sectional view of one embodiment of a clear optical state of an electro-optical display element.

FIG. 7C illustrates a cross-sectional view of one embodiment of a clear optical state of electro-optical display element 500. The clear optical state is achieved by applying a compacting negative bias condition or voltage signal to bottom electrode 504 such that the colorant particles are compacted within recess regions 514.

Figure 8A:
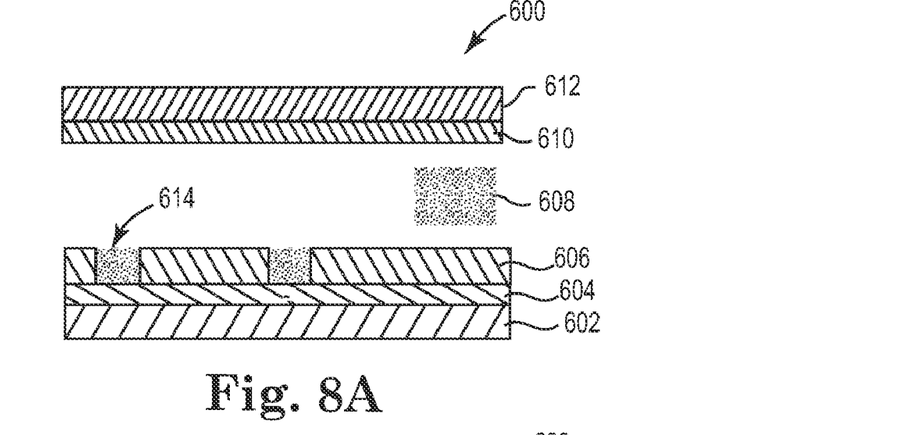
FIG. 8A illustrates a cross-sectional view of one embodiment of a grayscale optical state of an electro-optical display element.

FIG. 8A illustrates a cross-sectional view of one embodiment of a grayscale optical state of an electro-optical display element 600. Electro-optical display element 600 includes a substrate 602, a bottom electrode 604, a dielectric layer 606 including recess regions 614, a display volume 608, a top electrode 610, and a transparent material or substrate 612. In this embodiment, bottom electrode 604 and top electrode 610 are continuous or blanket electrodes. Dielectric layer 606 is patterned to provide a static, pre-patterned grayscale image based on the ratio of exposed and covered regions of bottom electrode 604.

In one embodiment, substrate 602 includes a reflective material or an optically clear or transparent material, such as plastic (e.g., PET) or other suitable material. In one embodiment, transparent material or substrate 612 also includes an optically clear material, such as plastic (e.g., PET) or other suitable material. Bottom electrode 604 and top electrode 610 include inorganic materials such as ITO, organic materials such as PEDOT, nanoparticle networks such as carbon nanotubes or silver nanowires, or other suitable thin film conductive materials that can be patterned. Dielectric material 606 includes an optically clear or transparent electrically insulating material.

For positively charged colorant particles, bottom electrode 604 with shade patterned dielectric layer 606 can hold the colorant particles according to the pattern when a small negative holding bias or voltage signal is applied to bottom electrode 604. In this state, some of the colorant particles are held in recess regions 614 while some of the colorant particles, which are away from recess regions 614, remain in display volume 608. The ratio of the blocked and open regions of dielectric layer 606 determines the static, pre-patterned grayscale image.

Figure 8B:
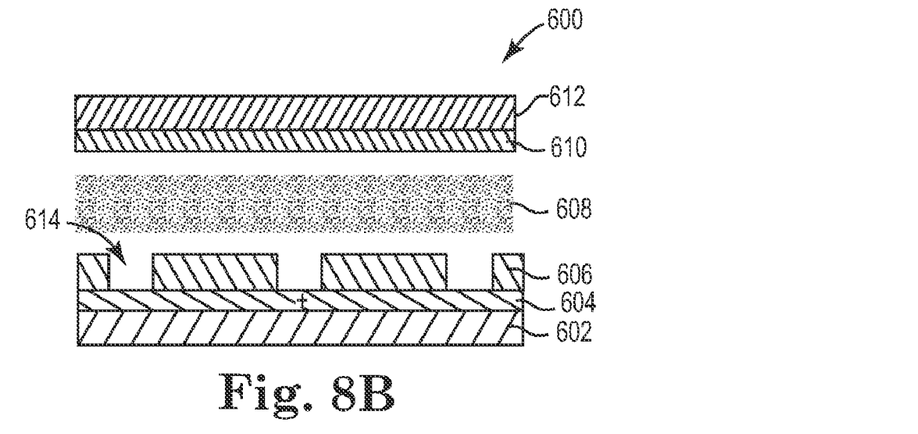
FIG. 8B illustrates a cross-sectional view of one embodiment of a dark optical state of an electro-optical display element.

FIG. 8B illustrates a cross-sectional view of one embodiment of a dark optical state of electro-optical display element 600. The dark optical state is achieved from either the grayscale optical state or the clear optical state by applying a voltage signal or pulsing opposite bias conditions on bottom electrode 604 and top electrode 610 to spread the colorant particles into display volume 608. With the colorant particles diffused uniformly within the display volume 608, the dark optical state is displayed.

Figure 8C:
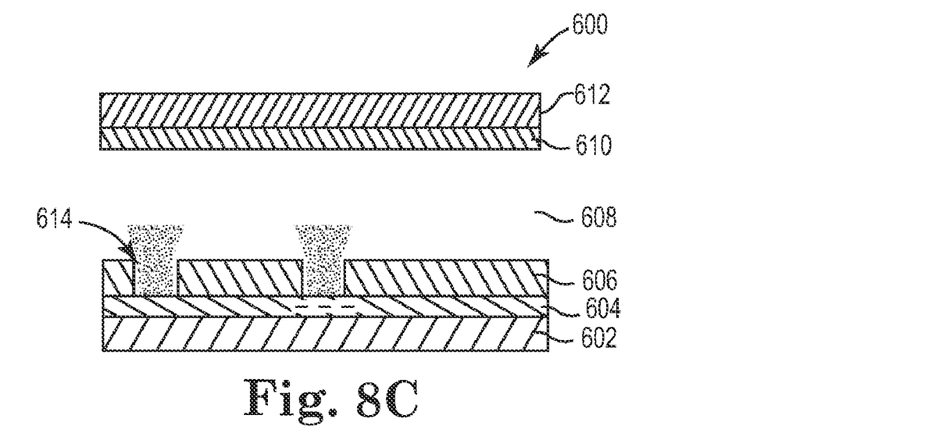
FIG. 8C illustrates a cross-sectional view of one embodiment of a clear optical state of an electro-optical display element.

FIG. 8C illustrates a cross-sectional view of one embodiment of a clear optical state of electro-optical display element 600. The clear optical state is achieved by applying a larger compacting negative bias condition or voltage signal to bottom electrode 604 than the negative bias condition applied for the grayscale optical state previously described and illustrated with reference to FIG. 8A. This method may not be as effective in compacting all the colorant particles since the number of recess regions for compacting the colorant particles may be reduced. In another embodiment, dielectric layer 606 includes uniform dot recess regions and bottom electrode 604 is patterned to provide the desired grayscale level.

Figure 9:
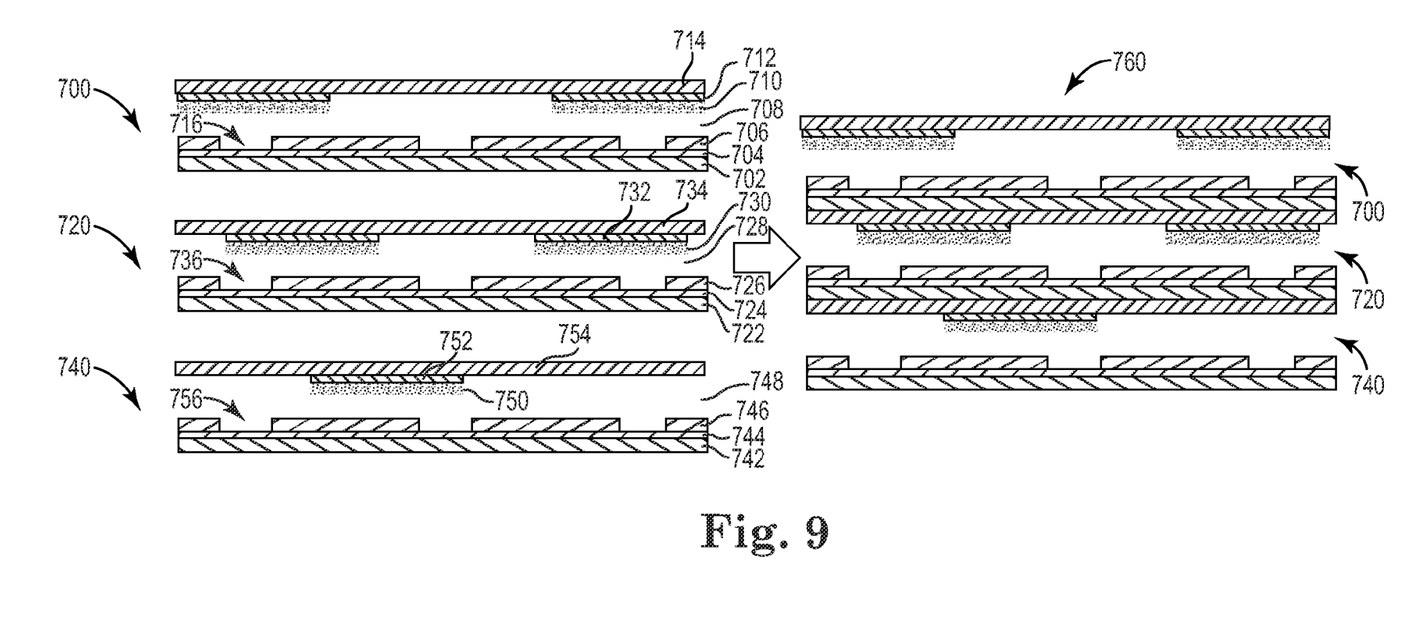
FIG. 9 illustrates a cross-sectional view of one embodiment of stacking grayscaled primary colorant layers for full color static images.

FIG. 9 illustrates a cross-sectional view of one embodiment of stacking grayscaled primary colorant layers for full color static images. Single color display element 700 includes a substrate 702, a bottom electrode 704, a dielectric layer 706 including recess regions 716, a display volume 708, yellow colorant particles 710, a patterned top electrode 712, and a transparent material 714. Single color display element 720 includes a substrate 722, a bottom electrode 724, a dielectric layer 726 including recess regions 736, a display volume 728, magenta colorant particles 730, a patterned top electrode 732, and a transparent material 734. Single color display element 740 includes a substrate 742, a bottom electrode 744, a dielectric layer 746 including recess regions 756, a display volume 748, cyan colorant particles 750, a patterned top electrode 752, and a transparent material 754.

Each single color display element 700, 720, and 740 provides monochrome information for the desired static image. The grayscale images are different for each primary color and are tuned following correlational curves for proper grayscale levels for each primary color. The individual colorant layers are produced and then brought together to provide a full color display element 760 for displaying the full color static image. The full color static image is displayed when each of electrodes 712, 732, and 752 are biased to attract colorant particles 710, 730, and 750, respectively, as illustrated in FIG. 9. In other embodiments, two (e.g., CM), four (e.g. CYMK), or another suitable number of single color display elements are combined to provide a multicolor display. While FIG. 9 illustrates producing a static grayscale image by patterning the top electrode of each colorant layer, in other embodiments the grayscale image for each colorant layer is produced by using display elements as previously described and illustrated with reference to FIGS. 3A-8C.

Figure 10A:
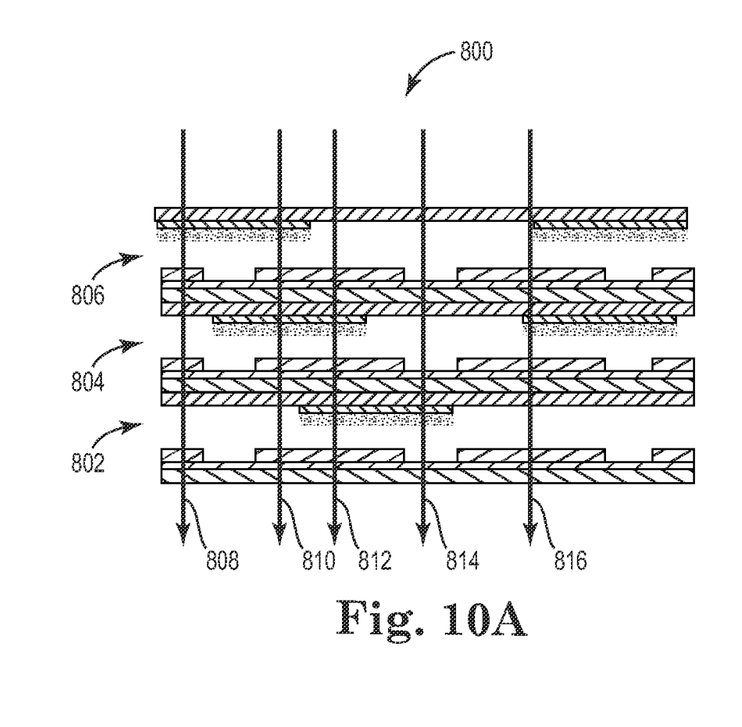
FIG. 10A illustrates a cross-sectional view of one embodiment of a full color transmissive static display.

FIG. 10A illustrates a cross-sectional view of one embodiment of a full color transmissive static display 800. Display 800 includes a cyan display element 802, a magenta display element 804, and a yellow display element 806. Magenta display element 804 is stacked on cyan display element 802, and yellow display element 806 is stacked on magenta display element 804. Each display element 802, 804, and 806 includes a transparent substrate, transparent bottom and top electrodes, a transparent dielectric layer, and a display volume as previously described and illustrated with reference to FIG. 9.

The combination of colored display elements 802, 804, and 806 provide a static full color image as indicated by arrows 808, 810, 812, 814, and 816. Arrow 808 indicates a first color provided by light passing through the colorant particles of yellow display element 806. Arrow 810 indicates a second color provided by light passing through the colorant particles of yellow display element 806 and magenta display element 804. Arrow 812 indicates a third color provided by light passing through the colorant particles of magenta display element 804 and cyan display element 802. Arrow 814 indicates a fourth color provided by light passing through the colorant particles of cyan display element 802. Arrow 816 indicates a fifth color provided by light passing through the colorant particles of magenta display element 804.

Figure 10B:
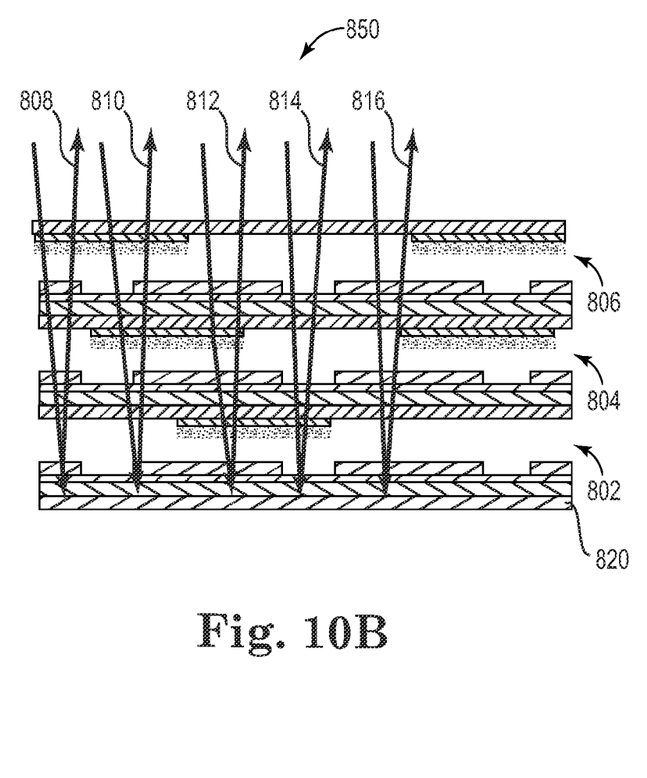
FIG. 10B illustrates a cross-sectional view of one embodiment of a full color reflective static display.

FIG. 10B illustrates a cross-sectional view of one embodiment of a full color reflective static display 850. Display 850 includes a cyan display element 802, a magenta display element 804, and a yellow display element 806. Magenta display element 804 is stacked on cyan display element 802, and yellow display element 806 is stacked on magenta display element 804. Each display element 802, 804, and 806 includes a transparent substrate, transparent bottom and top electrodes, a transparent dielectric layer, and a display volume as previously described and illustrated with reference to FIG. 9. In addition, display 850 includes a white reflector 820 on the bottom of the substrate of cyan display element 802. Thus, in this embodiment, the combination of colored display elements 802, 804, and 806 with white reflector 820 provide a static full color reflected image as indicated by arrows 808, 810, 812, 814, and 816, which represent the same colors as previously described and illustrated with reference to FIG. 10A.

Embodiments provide static grayscale images for electro-optical display devices. Embodiments can be used to provide reflective, monochrome, black and white, or color displays. Embodiments can also be used to provide transmissive monochrome, black and white, or color displays. In addition, embodiments can be used to provide backlit electrophoretic monochrome, black and white, or color displays. The embodiments have multiple applications for apparel, marketing, handheld electronics, lap-top computers, lighting, etc.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A device comprising:
   a first display element comprising:
   a first electrode;
   a transparent dielectric layer having recessed regions therein over the first electrode;
   a halftoned second electrode opposite the first electrode; and
   a fluid with colorant particles between the first electrode and the second electrode,
   wherein a voltage signal applied between the first electrode and the second electrode controls movement of the colorant particles such that a first voltage signal provides a clear optical state by compacting the colorant particles into the recessed regions and a second voltage signal provides a grayscale optical state by attracting the colorant particles to the second electrode, and
   wherein a third voltage signal applied between the first electrode and the second electrode provides a dark optical state by dispersing the colorant particles between the first electrode and the second electrode.

2. The device of claim 1, wherein the second electrode comprises a transparent conductor.

3. The device of claim 1, wherein the recessed regions in the dielectric layer form a pattern of dots when viewed in plan.

4. The device of claim 1, wherein the first electrode comprises a segmented electrode.

5. The device of claim 1, wherein the first electrode comprises a continuous electrode.

6. The device of claim 1, further comprising:
   a first substrate supporting the first electrode; and
   a second substrate supporting the second electrode.

7. The device of claim 6, wherein at least one of the first substrate and the second substrate comprises a transparent material.

8. A device comprising:
   a first display element comprising:
   a first electrode;
   a transparent dielectric layer having recessed regions therein over the first electrode;
   a halftoned second electrode opposite the first electrode;
   a fluid with colorant particles between the first electrode and the second electrode;
   a first substrate supporting the first electrode; and
   a second substrate supporting the second electrode,
   wherein a voltage signal applied between the first electrode and the second electrode controls movement of the colorant particles such that a first voltage signal provides a clear optical state by compacting the colorant particles into the recessed regions and a second voltage signal provides a grayscale optical state by attracting the colorant particles to the second electrode, and
   wherein the first substrate comprises a reflective material.

9. A device comprising:
   a first display element comprising:
   a first electrode;
   a transparent dielectric layer having recessed regions therein over the first electrode;
   a halftoned second electrode opposite the first electrode; and
   a fluid with colorant particles between the first electrode and the second electrode,
   wherein a voltage signal applied between the first electrode and the second electrode controls movement of the colorant particles such that a first voltage signal provides a clear optical state by compacting the colorant particles into the recessed regions and a second voltage signal provides a grayscale optical state by attracting the colorant particles to the second electrode; and
   a second display element stacked on the first display element to provide a multicolor display device, the second display element comprising:
   a first electrode;
   a dielectric layer having recessed regions therein over the first electrode;
   a halftoned second electrode opposite the first electrode; and
   a fluid with colorant particles between the first electrode and the second electrode,
   wherein a voltage signal applied between the first electrode and the second electrode controls movement of the colorant particles such that a first voltage signal provides a clear optical state by compacting the colorant particles into the recessed regions and a second voltage signal provides a grayscale optical state by attracting the colorant particles to the second electrode.

10. A device comprising:
    a first electrode;
    a patterned dielectric layer over the first electrode;
    a second electrode opposite the first electrode; and
    a display volume comprising a fluid with colorant particles between the first electrode and the second electrode,
    wherein a voltage signal applied between the first electrode and the second electrode controls movement of the colorant particles such that a first voltage signal provides a grayscale optical state by attracting portion of the colorant particles to exposed portions of the first electrode while another portion of the colorant particles, which are away from the exposed portions of the first electrode, remain in the display volume, and a second voltage signal provides a dark optical state by dispersing the colorant particles between the first electrode and the second electrode.

11. The device of claim 10, wherein the second electrode comprises a transparent conductor.

12. The device of claim 10, further comprising:
    a reflector adjacent the first electrode or the second electrode.

13. The device of claim 10, wherein the dielectric layer comprises a non-uniform pattern of recesses.

14. A device comprising:
a first electrode;
a patterned dielectric layer over the first electrode;
a second electrode opposite the first electrode; and
a fluid with colorant particles between the first electrode and the second electrode,
wherein a voltage signal applied between the first electrode and the second electrode controls movement of the colorant particles such that a first voltage signal provides a grayscale optical state by attracting at least a portion of the colorant particles to exposed portions of the first electrode and a second voltage signal provides a dark optical state by dispersing the colorant particles between the first electrode and the second electrode,
wherein at least one of the first electrode and the second electrode comprises a segmented electrode, and
wherein the fluid with colorant particles extends uninterrupted over the segmented electrode.

15. A device comprising:
a first electrode;
a patterned dielectric layer over the first electrode;
a second electrode opposite the first electrode; and
a fluid with colorant particles between the first electrode and the second electrode,
wherein a voltage signal applied between the first electrode and the second electrode controls movement of the colorant particles such that a first voltage signal provides a grayscale optical state by attracting at least a portion of the colorant particles to exposed portions of the first electrode and a second voltage signal provides a dark optical state by dispersing the colorant particles between the first electrode and the second electrode,
wherein the first electrode is patterned;
wherein the dielectric layer comprises a uniform pattern of recesses, and
wherein the fluid with colorant particles extends uninterrupted over the patterned first electrode.

16. A method for producing a static grayscale image for an electro-optical display device, the method comprising:
applying a conductor to a first substrate;
removing portions of the conductor to provide a patterned first electrode;
joining the first substrate and first electrode to a second substrate supporting a second electrode and a dielectric layer over the second electrode, the dielectric layer comprising recessed regions;
filling a space between the first electrode and the second electrode with a fluid with colorant particles; and
applying a first voltage signal between the first electrode and the second electrode to produce a static grayscale image by attracting the colorant particles onto the patterned first electrode.

17. The method of claim 16, wherein removing portions for the conductor comprises one of laser delamination and laser ablation.

18. The method of claim 16, wherein removing portions for the conductor comprises one of wet or dry etching and photo-patterning.

19. The method of claim 16, wherein applying the conductor to the first substrate comprises applying a transparent conductor to a transparent first substrate.

20. The method of claim 16, wherein removing portions of the conductor comprises removing portions of the conductor to provide a halftoned patterned first electrode.

* * * * *